(12) United States Patent
Kage et al.

(10) Patent No.: US 6,523,892 B1
(45) Date of Patent: Feb. 25, 2003

(54) SEAT STRUCTURE FOR VEHICLE

(75) Inventors: Masayuki Kage, Hiroshima-ken (JP); Hiroyuki Matsumoto, Hiroshima-ken (JP); Kazutaka Ishikura, Hiroshima-ken (JP); Takao Fukuda, Hiroshima-ken (JP); Toshihiro Ishikawa, Hiroshima-ken (JP); Naoki Okano, Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/571,935

(22) Filed: May 16, 2000

(30) Foreign Application Priority Data

May 20, 1999 (JP) ............................................. 11-140620
Jul. 12, 1999 (JP) ............................................. 11-198148

(51) Int. Cl.⁷ ................................................ B60N 2/42
(52) U.S. Cl. ............................. 297/216.13; 297/216.14
(58) Field of Search ....................... 297/216.12, 216.13, 297/216.14

(56) References Cited

U.S. PATENT DOCUMENTS 6,019,424 A * 2/2000 Ruckert et al. ......... 297/216.12
6,022,074 A * 2/2000 Swedenklef ........... 297/216.13
6,024,406 A * 2/2000 Charras et al. ..... 297/216.14 X
6,062,243 A * 5/2000 Schroten et al. ....... 297/216.13
6,062,642 A * 5/2000 Sinnhuber et al. ..... 297/216.13

FOREIGN PATENT DOCUMENTS

| DE | 197 38 201 A 1 | 4/1998 |
| EP | 0 888 926 A1 | 1/1999 |
| GB | 2 329 113 A | 3/1999 |
| JP | 07291005 | 11/1995 |
| JP | 7-291005 | 11/1995 |
| JP | 10-80338 | 3/1998 |
| JP | 10080338 | 3/1998 |
| WO | WO 98/09838 | 3/1998 |

* cited by examiner

Primary Examiner—Anthony D. Barfield
(74) Attorney, Agent, or Firm—Nixon Peabody LLP; Donald R. Studebaker

(57) ABSTRACT

A headrest movable frame (2) has an upper frame (2b) which is arranged on the upper end face of a seatback and extends in the widthwise direction of the vehicle body, and side frames (10) which are arranged on the side end faces of the seatback and extend in the up-and-down direction. A lower frame (2c) is axially supported on the side frames (10) at a position below the upper frame (2b). Guide holes (3) linearly move a headrest (1) upward and forward by a backward load acting on the lower portion of the lower frame (2c) of the headrest movable frame (2) in a rear impact collision.

15 Claims, 12 Drawing Sheets

PRIOR ART

PRIOR ART

PRIOR ART

PRIOR ART

PRIOR ART

PRIOR ART

SEAT STRUCTURE FOR VEHICLE

FIELD OF THE INVENTION

The present invention relates to a seat structure for a vehicle, which displaces a headrest forward in a rear impact collision.

BACKGROUND OF THE INVENTION

Japanese Patent Laid-Open No. 10-80338 (see FIGS. 12 to 14) describes a structure, which receives the passenger load in a rear impact collision by moving backward a shock receiving frame 52 located in front of a seatback frame 51, moves the lower end portion of a headrest support frame 53 backward upon backward movement of the shock receiving frame 52, and moves a headrest 55 fixed to the upper end portion of the headrest support frame 53 toward a head 56 of the passenger, since the middle portion of the headrest support frame 53 is axially supported by the seatback frame 51 to be pivotal in the back-and-forth direction.

Japanese Patent Laid-Open No. 7-291005 (see FIGS. 9 to 11) describes a structure in which a coupling member 58, which extends backward upon receiving the passenger load in a rear impact collision, is provided to the coupling portion between a seatback frame 51 that supports a headrest 55, and a cushion member 57 which is provided to the seatback frame 51, the headrest support frame 53 pivots about a pivot member 54 when the coupling member 58 extends backward in a rear impact collision, and the headrest 55 moves forward toward a head 56 of a passenger.

When the upper body of the seated passenger is divided into a lower portion (waist) and an upper portion (chest), and the passenger is normally seated, the lower portion of the upper body contacts a seatback, but the upper portion of the upper body is slightly separated from the seatback. Hence, in a rear impact collision, the seatback receives the load from the lower portion of the upper body, and then that from the upper portion of the upper body. In such rear impact collision, the load from the lower portion of the upper body is larger than that from the upper portion of the upper body. That is, in a rear impact collision, the load from the lower portion (waist) of the upper body is quicker and larger than that from the upper portion of the upper body. Ideally, in a rear impact collision, since the headrest must be quickly and stably moved forward and upward toward the head of a passenger, the present invention is premised on that the headrest is moved forward upon receiving the load from the passenger's waist, as described in Japanese Patent Laid-Open Nos. 7-291005 and 10-80338 (FIGS. 9 to 14). Under such circumstance, as shown in FIGS. 9 to 14, when the headrest support frame 53 is axially supported by the upper frame of the seatback frame 14, since the spacing between an axial support point 54 of the frame 53 and the shock receiving frame 52 becomes considerably larger than that between the axial support point 54 and headrest 55, it is difficult to assure a required forward moving amount of the headrest. That is, upon displacing the headrest forward by a required amount in a rear impact collision, since the shock receiving frame requires a large moving amount since it receives the passenger's load, the forward displacement amount of the headrest cannot reach a required level or forward displacement delays. Especially, such problem is conspicuous when the seated passenger is lightweight.

On the other hand, a required forward moving amount of the headrest may be assured by setting the axial support portion of the frame that supports the headrest at substantially the middle position of the seatback in the up-and-down direction, i.e., prolonging the distance from the axial support portion to the headrest. In this structure, since a portion of the frame above the axial support portion is largely displaced forward, the upper portion of the frame may unwantedly push the back of the passenger forward.

SUMMARY OF THE INVENTION

The present invention has been made in consideration of the above problems, and has as its object to provide a seat structure for a vehicle, which can quickly and stably move a headrest forward by a required amount upon receiving a load from the passenger's waist in a rear impact collision.

The present invention has been made in consideration of the above problems, and has as its another object to provide a seat structure for a vehicle, which can suppress forward dislodging of a load transfer portion while quickly and stably moving a headrest forward by a required amount upon receiving a load from the passenger's waist in a rear impact collision.

In order to solve the aforementioned problems and to achieve the above objects, according to the first invention, since a load transfer portion is axially supported by side surface frames below an upper surface frame, it can receive a load from the passenger's waist and the headrest can be quickly and stably moved forward by a required amount in a rear impact collision.

According to the second invention, since the instantaneous center of rotation (center of rotation) of the load transfer portion is set above the mean load point (input center) of the load acting from the passenger to a pressure receiving portion and load transfer portion, the headrest can be reliably displaced forward by the load acting from the passenger in a rear impact collision.

According to the third invention, the structure further comprises a first guide for moving the pressure receiving portion backward and upward by the load acting on the pressure receiving portion, and a second guide for moving the load transfer portion upward, the first guide is located below the second guide, and the first and second guides respectively axially support the load transfer portion and pressure receiving portion on the side surface frames below the upper surface frame, thus moving the pressure receiving portion by a simple structure. Also, the headrest can be reliably displaced upward and forward by the backward load acting from the passenger in a rear impact collision.

According to the fourth invention, the first and second guides comprise a combination of link members for coupling the side surface frames and pressure receiving portion, and guide holes which are formed in the side surface frames and guide the load transfer portion upward, thus moving the pressure receiving portion by a mechanically simple structure.

Since the first and second guides have different support structures, even when, for example, a seatback frame has been twisted, the headrest can be stably displaced forward and upward in a rear impact collision. Since one of the first and second guides uses the link member having excellent durability and operation stability, and the other uses the guide hole that can be formed in a small space, operation stability and space savings can be maintained at high level.

According to the fifth invention, since the first guide comprises link members for coupling the side surface frames and pressure receiving portion, and the second guide comprises guide holes which are formed in the side surface frames and guide the load transfer portion upward, the pressure receiving portion can be moved by a mechanically simple structure.

In general, a lumber support that protrudes forward to hold the passenger's waist is formed on the lower seatback portion, but no lumber support is formed on the upper seatback portion since it disturbs driving operation of the passenger. That is, a member to be disposed inside the seatback can have only a smaller size in the back-and-forth direction of the vehicle body in the upper seatback portion than that in the lower seatback portion, but a structure that does not require any large space, i.e., a guide hole, is adopted for at least the upper axial support point, thus minimizing the member size in the back-and-forth direction of the vehicle body. On the other hand, a guide hole can also be used as the lower axial support point. However the link member has excellent durability and operation stability, and can stably operate by adopting a support method different from that of the upper axial support point even when the seatback frame has been twisted. Furthermore, since the first guide uses the link member which has excellent durability and operation stability, and the second guide uses the guide hole that can be formed in a small space, durability, operation stability, and space savings can be maintained at high level.

According to the sixth invention, since the first guide comprises link members for coupling the side surface frames and pressure receiving portion, and guide holes formed in the side surface frames and guide the load transfer portion upward, and the load from the passenger's waist is received by the pressure receiving portion, an extra load is input to the first guide in a rear impact collision. Therefore, since the first guide is formed by different mechanisms, i.e., the link member and guide hole, such extra load can be reliably converted into forward displacement of the headrest. Since the link member which has excellent durability and operation stability, and the second guide uses the guide hole that can be formed in a small space are used, durability, operation stability, and space savings can be maintained at high level.

According to the seventh invention, since the guide holes [second guide holes formed in the side surface frames to guide the load transfer portion upward] are formed in an arcuated shape which is convex toward the rear side of the vehicle body, they can move the headrest upward and forward relatively linearly, and can suppress the moving speed of the headrest toward the passenger's head from considerably changing while the headrest is being displaced at an identical speed.

According to the eighth invention, since the guide hole has a shape that defines the moving path of the headrest to be convex downward compared to a linear path, a high forward moving speed at which the headrest can quickly approach the passenger's head can be assured.

Also, the distance between the passenger's head and headrest can be quickly shortened at an early timing of headrest movement, and when the passenger's head actually contacts the headrest, the relative speed between the passenger's head and headrest can be minimized (since the moving direction of the headrest has changed in an upward direction). Furthermore, even when the passenger is a child (with a light weight and small height), the headrest can be reliably displaced toward the head of the passenger with a small height at an early timing of movement. When the passenger has a light weight like a child, the headrest cannot often be displaced by a sufficient amount. However, since the forward displacement of the headrest to be preferentially operated by the aforementioned structure is done at an early timing of movement, the headrest can be reliably displaced forward even for a lightweight child.

According to the ninth invention, since the guide hole has a shape that linearly displaces the headrest upward and forward, a nearly constant moving speed of the headrest toward the passenger's head can be set while the headrest is being displaced at an identical speed.

According to the 10th invention, the load transfer portion crosses the upper surface frame of the seatback on the front side of the vehicle when viewed from the back-and-forth direction of the vehicle body, and allows forward displacement of the headrest, thus quickly displacing the headrest forward.

Since the upper surface frame does not disturb forward movement of the headrest, the headrest can be reliably moved forward in a rear impact collision.

According to the 11th invention, the load transfer portion ordinarily contacts the upper surface frame and can be displaced only toward the front side of the vehicle body to prevent the headrest from moving toward the rear side of the vehicle body, even when the headrest is pressed toward the rear side of the vehicle body or when a portion of the load transfer portion below the axial support points by the side surface frames is pressed. Hence, even when the headrest is pressed from the front side by the head of the seated passenger, or even when the passenger on a rear seat presses the portion of the load transfer portion below the axial support point toward the front side of the vehicle body, the headrest, load transfer portion, and pressure receiving portion can be prevented from being displaced unexpectedly, thus preventing passengers from being disturbed.

According to the 12th invention, the load transfer portion is surrounded by the side surface frames of the seatback to prevent the outer surface shape of the seatback from changing when the headrest has been displaced. Hence, the load transfer portion can move the headrest without disturbing the passenger.

According to the 13th invention, since an allowance portion that allows the passenger's chest to be displaced backward is formed on the side surface frames above the axial support portions of the load transfer portion, forward dislodging of the load transfer portion can be suppressed while receiving the load from the passenger's waist, and quickly and stably moving the headrest forward.

According to the 14th invention, since the allowance portion is formed by bending backward a portion of the load transfer portion above the axial support portions, forward dislodging of the load transfer portion can be suppressed by a simple structure.

According to the 15th invention, since at least a portion of the load transfer portion above the axial support portions is comprised of a rectangular frame, and the allowance portion is formed in a space bounded by the rectangular frame, the moving space of the back of the passenger can be assured by a simple structure.

According to the 16th invention, since a shock absorber for absorbing the load that acts upon backward movement of the passenger's chest is arranged in the space, shock absorbency at the back of the passenger can be improved.

According to the 17th invention, since a restriction member that restricts back-and-forth movement of the headrest support portion is provided to the upper surface frame [upper edge portion of the seatback frame], cluttering of the headrest in an ordinary use can be suppressed.

According to the 18th invention, since the headrest support portion is arranged on the front surface of the upper surface frame [upper edge portion of the seatback frame], and the restriction member restricts forward movement of the headrest support portion, cluttering of the headrest can be suppressed. Also, since the load acting on the headrest in a rear impact collision is received by the seatback frame with high rigidity, the restriction member can have a simple structure.

According to the 19th invention, since the restriction member has a gap that allows movement of the headrest support portion by a predetermined amount, the structure for smoothly moving the headrest forward and upward can be simplified.

According to the 20th invention, since the restriction member is comprised of a lock member that locks a seat surface, its structure can be simple.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

[First Embodiment]

Figure 1:
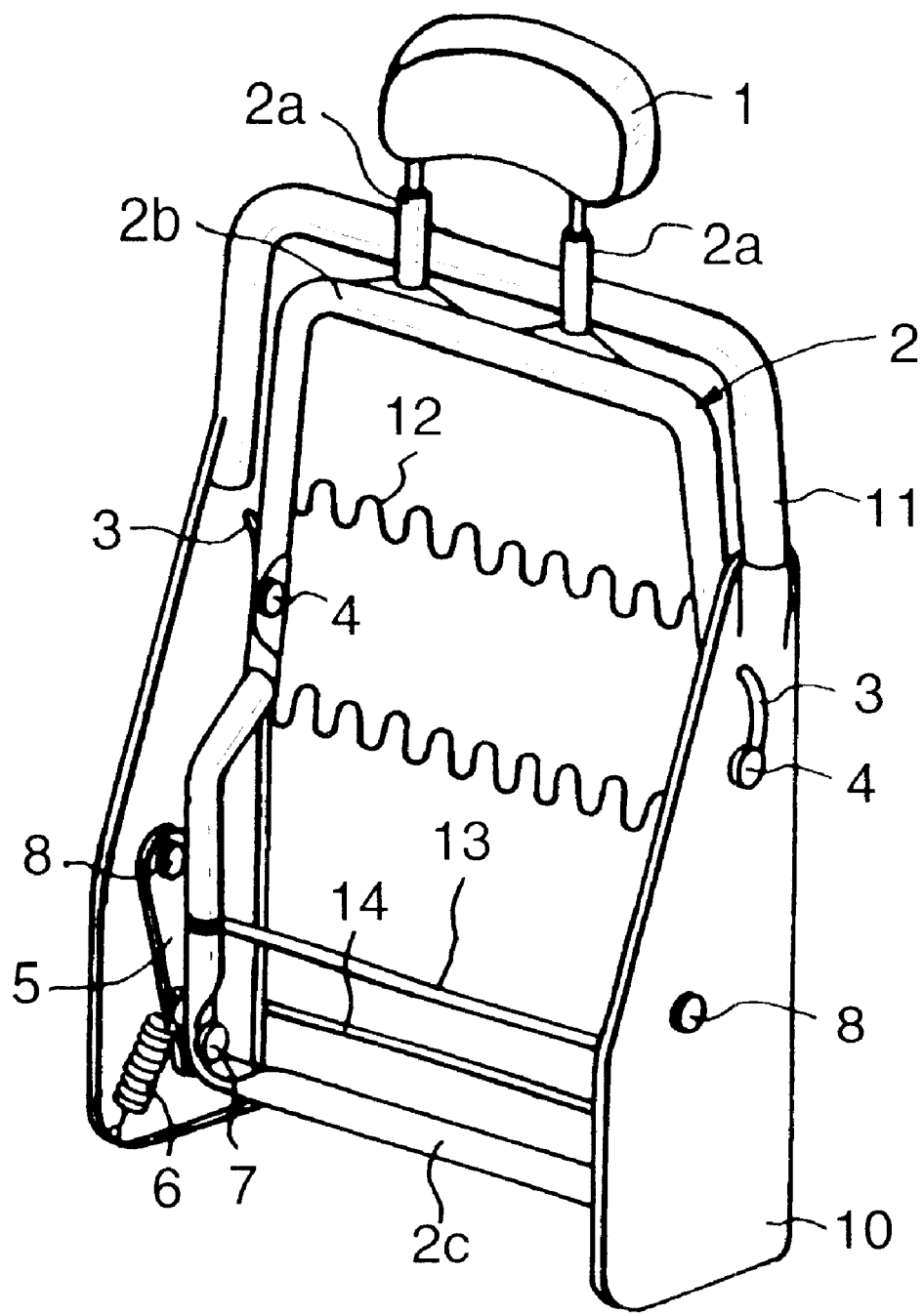
FIG. 1 is a perspective view of the interior of a seatback that shows a seat structure for a vehicle according to the first embodiment of the present invention.

FIG. 1 is a perspective view of the interior of a seatback that shows a seat structure for a vehicle according to the first embodiment of the present invention.

As shown in FIG. 1, in the seat structure for a vehicle of the first embodiment, a seatback having a reclining mechanism that can recline in the back-and-forth direction of the vehicle body comprises a headrest 1 which is disposed behind the passenger's head, a headrest movable frame 2 which supports the headrest 1

The headrest movable frame 2 can be moved by a mechanically simple structure, i.e., the guide holes 3 and link members 5, and requires low cost.

A U-shaped upper frame 11 with an open lower end is fixed to the side frames 10 to couple their right and left upper ends, and a lower frame 14 is also fixed to the side frames 10 to couple their right and left lower ends. S springs 12 extend between the right and left central portions of the side frames 10. The S springs 12 absorb loads acting from the passenger's back. Note that the S springs 12 are arranged for the purpose of providing a soft feel to the seatback (to allow the passenger's back to sink into the seatback), but a structure for providing a soft feel is not limited to the S springs.

The headrest movable frame 2 is axially supported on the side frames 10 by one-end portions of the link members 5 and first link axes 7 at the two end portions of the lower frame 2c in the widthwise direction of the vehicle body. The other-end portions of the link members 5 are axially supported on the side frames 10 by second link shafts 8, and are biased downward and forward by tension springs 6. The tension springs 6 are set to apply biasing forces that can prevent the seatback from moving backward by the pressure of the passenger in an ordinary state. and has a pressure receiving portion that receives the load acting from the back of the passenger in a rear impact collision, and guide holes 3 and link members 5 that axially support the headrest movable frame 2 to displace the headrest 1 forward and upward in the presence of a load acting on the headrest movable frame 2.

The headrest 1 is supported by headrest support guides 2a, which extend upward from the upper edge portion of the an upper frame 2b of the headrest movable frame 2.

The headrest movable frame 2 is formed by bending a metal rod into a rectangular shape, and its lower frame 2c is bent toward the front side of the vehicle body to protrude from the upper frame 2b for the purpose of receiving a pressure input from the passenger early in a rear impact collision. The headrest movable frame 2 is axially supported by right and left side frames 10 of the seatback via the guide holes 3 and guide shafts 4 at a position in the vicinity of its bent central frame, so as to be slidable in the up-and-down direction along the guide holes 3, and to be pivotal about the guide shafts 4. The guide holes 3 are formed into an arcuated shape which is convex toward the rear side of the vehicle body.

The lower portion of the headrest movable frame 2 is located in correspondence with the passenger's waist to serve as a pressure receiving portion. A wire 13 extends between substantially the central portion of the lower frame 2c of the headrest movable frame 2, and receives the load acting from the passenger's waist in a rear impact collision. That is, the linear wire 13 is provided at nearly the same level as that of the waist of the passenger who is seated on the seat, and receives the pressure from the passenger's waist in a rear impact collision. Note that the linear wire 13 is placed at the lowest possible position to improve passenger's comfort. Note that the wire 13 serving as a pressure receiving portion uses a linear wire 13, the two ends of which are welded to the side frames 10, and which linearly connects the two welded points, in place of an S- or U-shaped one. This is to convert the load acting from the passenger's waist into forward and upward movements of the headrest 1 as quickly as possible.

Figure 2:
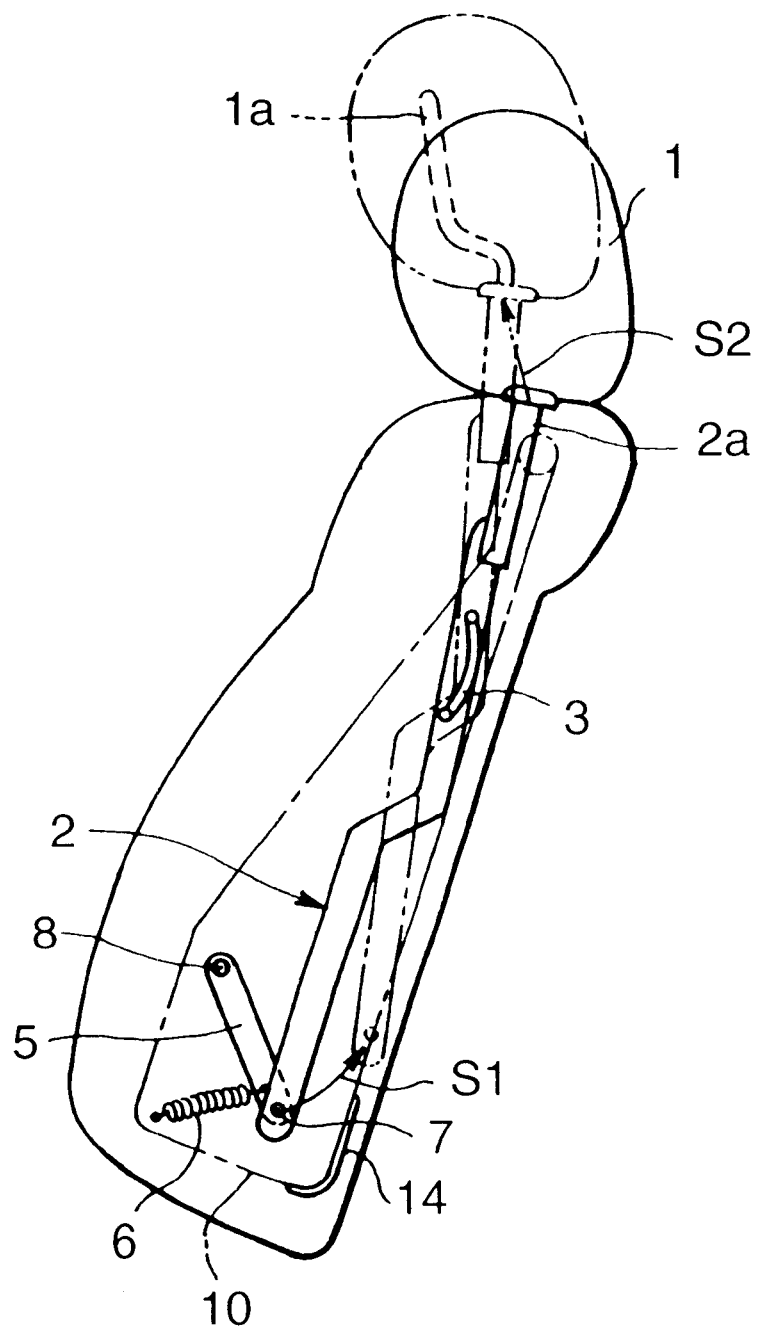
FIG. 2 is a side perspective view of the seatback of the first embodiment, which explains the operation of a headrest movable frame when a load acts from the back of a passenger in a rear impact collision.
Figure 3:
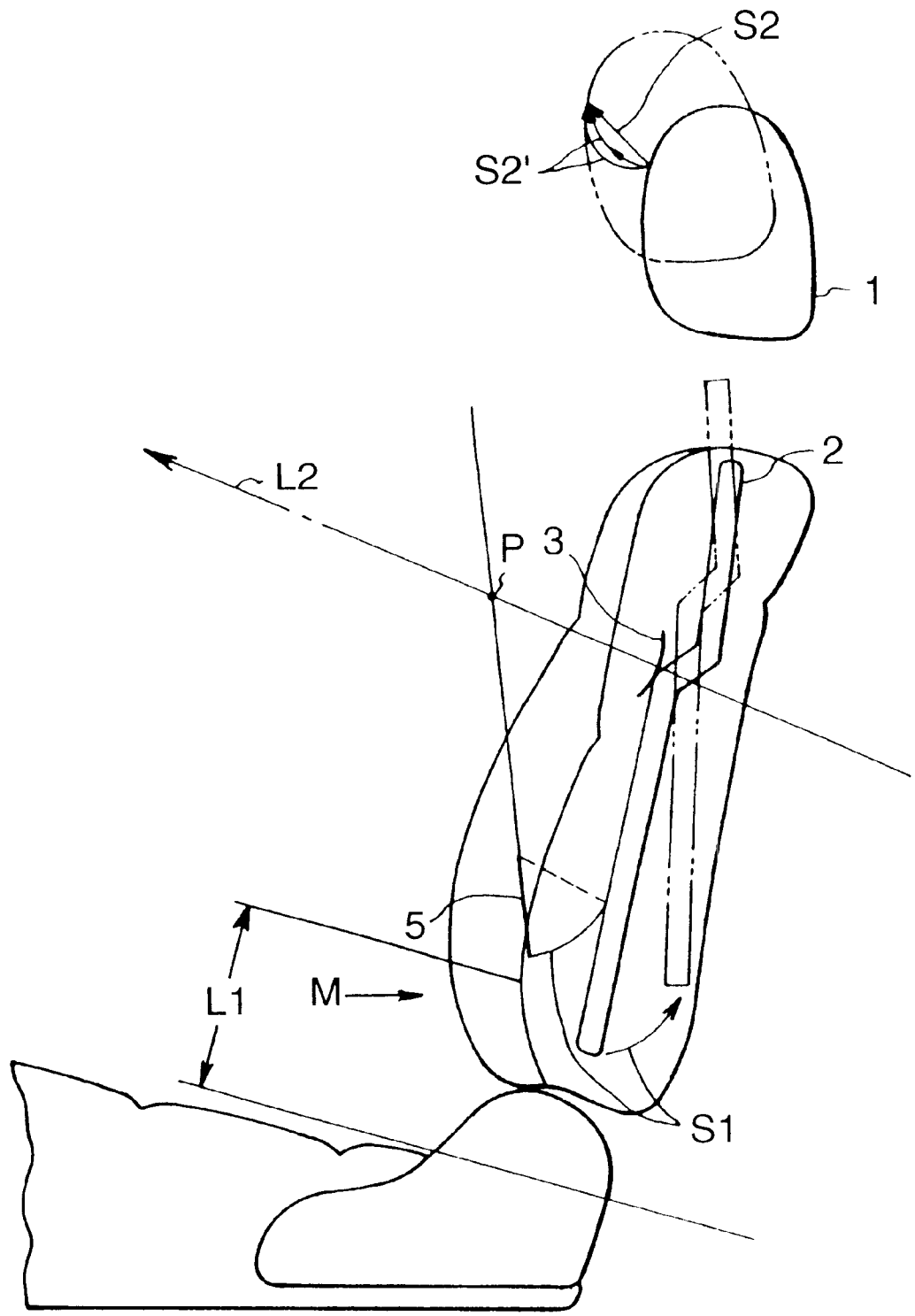
FIG. 3 is a side perspective view of the seatback of the first embodiment, which explains the operation of the headrest movable frame when a load acts from the back of a passenger in a rear impact collision.

FIGS. 2 and 3 are side perspective views of the seatback of the first embodiment to explain the operation of the headrest movable frame when a load acts from the passenger's waist in a rear impact collision.

As shown in FIG. 2, the link members 5 move the headrest movable frame 2 backward and forward (path S1) by the load acting on the lower portion of the lower frame 2c of the headrest movable frame 2, and the guide holes 3 move the headrest movable frame 2 upward (one-dashed chain curve in FIG. 2).

Referring to FIG. 2, since the guide holes 3 are formed into a shape which is convex toward the rear side of the vehicle body, the headrest movable frame 2 linearly displaces the headrest 1 upward and forward (moving path S2) in cooperation with the link members 5 (moving path S1). Since the headrest 1 linearly moves, the moving speed of the headrest toward the passenger's head can be set to be nearly constant while the headrest 1 is being displaced at an identical speed. On the other hand, if the guide holes 3 are formed to have a linear shape or a shape which is convex toward the front side of the vehicle body, the headrest 1 is displaced forward with respect to the vehicle body at an early timing of its movement, and is then displaced upward, as indicated by a path S2' in FIG. 3. In such case, the distance between the passenger's head and headrest can be shortened quickly at an early timing of movement of the headrest 1, and when the passenger's head contacts the headrest in practice, the relative speed between the passenger's head and headrest can be minimized (since the moving direction of the headrest has changed in the upward direction).

A headrest frame 1a of the headrest 1 protrudes forward with respect to the vehicle body. With this structure, the headrest can be moved early toward the passenger's head due to the presence of the forward protruding portion of the headrest frame 1a. If no such forward protruding portion is formed, a pad (urethane) formed in the headrest must have a larger thickness, and the head sinks into the pad, thus disturbing early movement of the headrest toward the passenger's head. The headrest support guides 2a cross the upper edge portion of the upper frame 11 on the front side of the vehicle body to permit upper and forward displacement of the headrest 1. That is, since the headrest support guides 2a contact the upper edge portion of the upper frame 11 while no load acts thereon, even when the head of the seated passenger exerts a backward load on the headrest 1 with respect to the vehicle body, or even when the passenger who is seated on a rear seat exerts a load on the lower portion of the headrest movable frame 2 from behind the seatback to the front side of the vehicle body, the headrest movable frame 2 can be prevented from moving unnecessarily.

That portion of the headrest movable frame 2, which is near its bent portion, is axially supported on the side frame 10 by the side holes 3, and its lower edge portion is axially supported on the side frame 10 by the link members 5.

When the upper body of the seated passenger is divided into a lower portion (waist) and an upper portion (chest), and the passenger is normally seated, the lower portion of the upper body contacts a seatback, but the upper portion of the upper body is slightly separated from the seatback. Hence, in a rear impact collision, the seatback receives the load from the lower portion of the upper body, and then that from the upper portion of the upper body. In such rear impact collision, the load from the lower portion of the upper body is larger than that from the upper portion of the upper body. In other words, in a rear impact collision, the load from the lower portion (waist) of the upper body is quicker and larger than that from the upper portion of the upper body. Ideally, in a rear impact collision, since the headrest must be quickly and stably moved forward and upward toward the passenger's head, this embodiment is premised on that the headrest is moved forward upon receiving the load from the passenger's waist. Under such circumstance, when a pressure receiving portion for receiving the load from the passenger's waist, i.e., the lower portion of the upper body, is provided, and the headrest movable frame is axially supported by the upper frame of the seatback frame as in the prior art, since the spacing between that axial support point and the pressure receiving portion becomes considerably larger than that between the axial support point and headrest, it is difficult to assure a required forward moving amount of the headrest. For this reason, in this embodiment, the headrest movable frame is supported on the side surface frames lower than the upper surface frame of the seatback frame to assure a required forward moving amount of the headrest in a rear impact collision.

The headrest movable frame 2 is surrounded by the side frames 10 so as to prevent the seatback shape from changing upon displacing the headrest 1.

With this structure, the headrest can be displaced without disturbing the passenger.

Also, since each guide hole 3 has an arcuated shape which is convex toward the rear side of the vehicle body, the headrest 1 can be linearly displaced obliquely upward toward the front side of the vehicle body.

Furthermore, as shown in FIG. 3, an instantaneous pivot center P of each guide hole 3 is located above a mean load point M acting on the lower portion of the headrest movable frame 2. The mean load point M represents the center-of-gravity position where loads distributed on the seatback are integrated in units of regions and largest loads acting on such integrated regions balance. For example, the mean weight point M generally falls within a range L around 200 to 300 mm above the seating surface of a seat cushion.

In this manner, even when a load from the shoulder above the mean weight point M acts, since the moment due to the load of the weight at the pivot center P, that acts on the headrest movable frame 2 becomes larger than a counter moment, the headrest movable frame 2 can reliably operate in a rear impact collision.

Note that the present invention can be applied to a modification or a change of the above embodiment within the scope of the invention.

For example, the guide holes 3 and link members 5 can be appropriately combined, and the same effect can be obtained when the link members 5 are axially supported by the guide holes 3.

The vertical positional relationship between the guide holes 3 and link members 5 with respect to the side frames 10 is not particularly limited. For example, the link members 5 may be placed at the upper positions of the side frames 10, and the guide holes 3 may be formed at lower positions, thus obtaining the same effect.

In general, a lumber support that protrudes forward to hold the passenger's waist is formed on the lower seatback portion, but no lumber support is formed on the upper seatback portion since it disturbs driving operation of the passenger. That is, a member to be disposed inside the seatback can have only a smaller size in the back-and-forth direction of the vehicle body in the upper seatback portion than that in the lower seatback portion. Hence, the guide holes are used as the upper axial support points to minimize the member size in the back-and-forth direction of the vehicle body. In this case, the guide holes may be used as the lower axial support points. However, the link members have excellent durability and operation stability, and even when the seatback frame has been twisted, the link members can operate stably by adopting a support method different from that for the upper support point. Furthermore, since the size restriction in the back-and-forth direction of the vehicle body is not strict, this embodiment uses the link members as the lower axial support points.

Furthermore, guide holes for axially supporting the first link shafts 7 of the link members 5 may be formed in the side frames 10 to guide the headrest movable frame upward.

[Second Embodiment]

Figure 4:
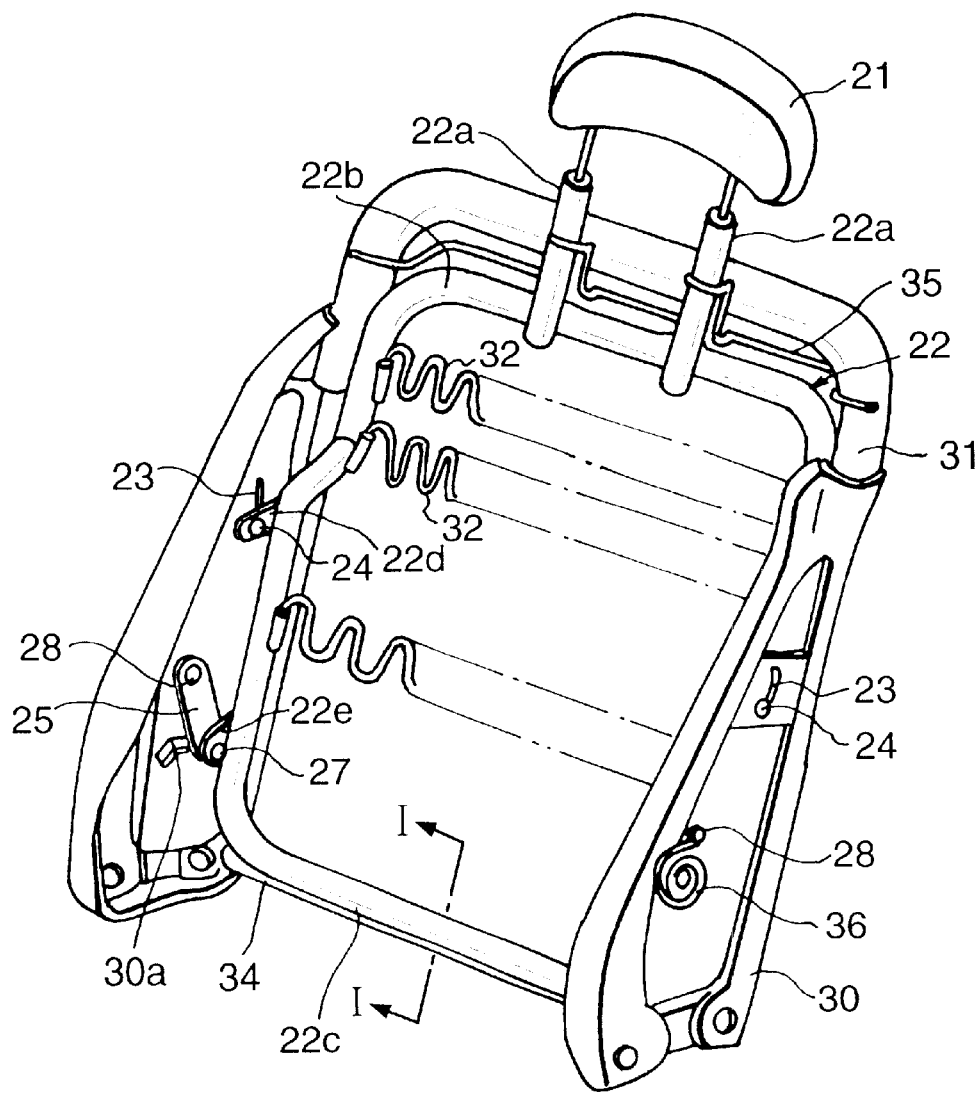
FIG. 4 is a perspective view of the interior of a seatback that shows a seat structure for a vehicle according to the second embodiment of the present invention.
Figure 5:
FIG. 5 is a sectional view taken along a line I—I in FIG. 4.
Figure 6:
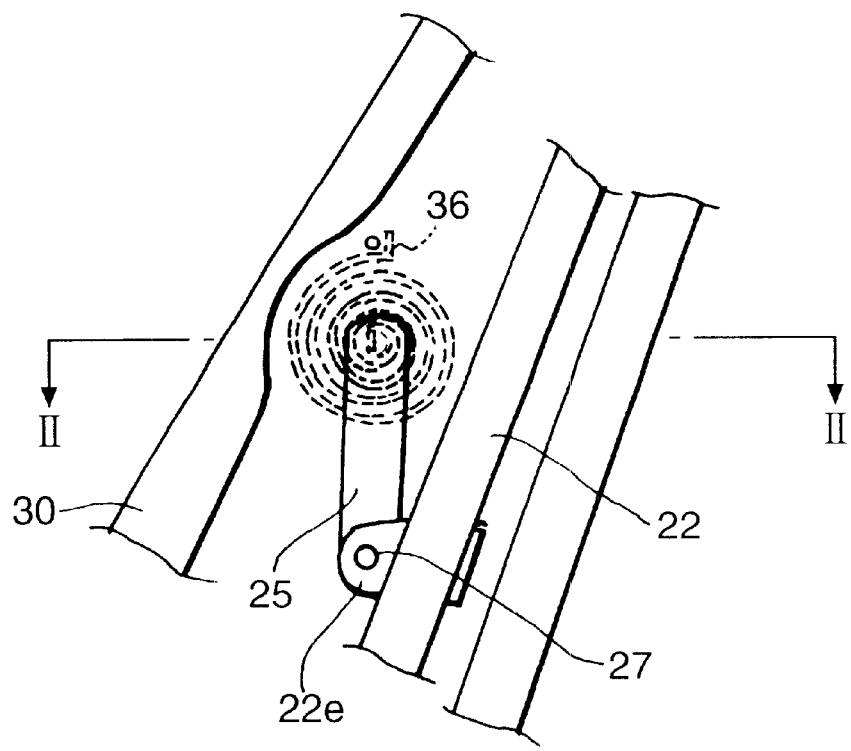
FIG. 6 is a view showing details of a link member.
Figure 7:
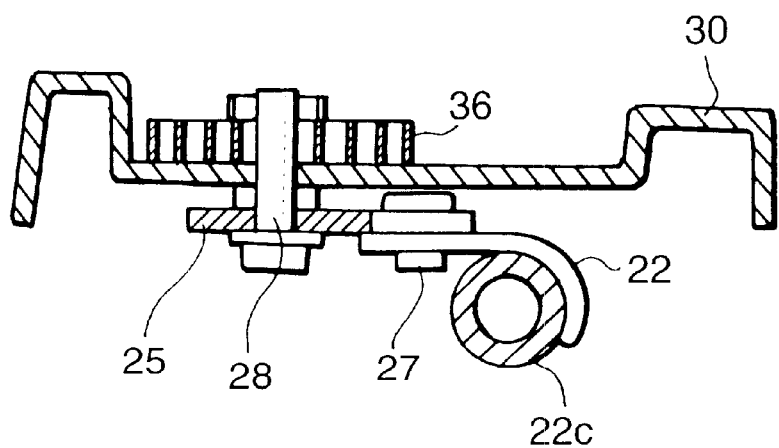
FIG. 7 is a sectional view taken along a line II—II in FIG. 6.

FIG. 4 is a perspective view of the interior of a seatback that shows a seat structure for a vehicle according to the second embodiment. FIG. 5 is a sectional view taken along a line I—I of FIG. 4. FIG. 6 is a view showing details of a link member. FIG. 7 is a sectional view taken along a line II—II of FIG. 6.

As shown in FIGS. 4 to 7, in the seat structure for a vehicle according to the second embodiment, a seatback having a reclining mechanism that can recline in the back-and-forth direction of the vehicle body comprises a headrest 21 which is disposed behind the passenger's head, a headrest movable frame 22 which supports the headrest 21 and has a pressure receiving portion that receives the load acting from the back of the passenger in a rear impact collision, and guide holes 23 and link members 25 that axially support the headrest movable frame 22 to displace the headrest 21 forward and upward by the load acting on the headrest movable frame 22.

The headrest 21 is supported by headrest support guides 22a, which extend upward from the upper edge portion of the an upper frame 22b of the headrest movable frame 22.

The headrest movable frame 22 is formed by bending a metal rod into a rectangular shape, and its lower frame 22c is bent toward the front side of the vehicle body to protrude from the upper frame 22b for the purpose of receiving a pressure input from the passenger early in a rear impact collision. As shown in FIG. 5, the lower frame 22c has a substantially D-shaped section with a flat front side. The headrest movable frame 22 is axially supported by first arms 22d protruding forward from the frame portions, that are bent forward, toward the front side of the vehicle body, and right and left side frames 30 of the seatback via the guide holes 23 and guide shafts 24, so as to be slidable in the up-and-down direction along the guide holes 23, and to be pivotal about the guide shafts 24. The guide holes 23 are formed into an arcuated shape which is convex toward the rear side of the vehicle body. Note that the guide holes 23 are not limited to the arcuated shape but may have a linear shape.

An upper frame 22b of the headrest movable frame 22 above the guide shafts 24 is bent toward the rear side of the vehicle body, so as to prevent the upper frame 22b from protruding forward to push the passenger's back upon pivoting about the guide shafts 24, thus allowing backward displacement of the passenger's back. That is, the headrest movable frame 22 permits backward displacement of the passenger's back at least within a space bounded by the upper frame 22b above the guide shafts 24.

The headrest movable frame 22 can be moved by a mechanically simple structure, i.e., the guide holes 23 and link members 25, and requires low cost.

A U-shaped upper frame 31 with an open lower end is fixed to the side frames 30 to couple their right and left upper ends, and a lower frame 34 is also fixed to the side frames 30 to couple their right and left lower ends. Two, upper and lower S springs 32 with a given spacing extend between the right and left central portions of the side frames 30. The S springs 32 absorb loads acting from the passenger's back. Note that the S springs 32 are arranged for the purpose of providing a soft feel to the seatback (to allow the passenger's back to sink into the seatback), but a structure for providing a soft feel is not limited to the S springs.

The headrest support guides 22a are arranged on the front surface of the upper edge portion of the upper frame 31, and a restriction member 35 that restricts back-and-forth movement of the headrest support guides 22a is provided to the upper arm 31 to extend across its widthwise direction of the vehicle body.

The restriction member 35 is comprised of a wire-like metal rod that locks the seat surface. The two end portions of the restriction member 35 are welded to the upper frame 31, those portions of the member 35, which correspond to the headrest support guides 22a, are bent to surround the headrest support guides 22a so as to restrict forward movement of the headrest support guides 22a, and two side portions of each bent portion are welded to the front surface of the upper frame 31. The restriction member 35 is welded to have a gap that allows forward movement of the headrest support guides 22a only by a predetermined amount (predetermined angle).

With this structure, cluttering of the headrest 21 can be suppressed in ordinary use.

The headrest movable frame 22 is axially supported on the side frames 30 by second arms 22e that project from the two end portions of the lower frame 22c in the widthwise direction of the vehicle body toward the front side of the vehicle body via one-end portions of the link members 25 and link shafts 27. The other-end portions of the link members 25 are axially supported on the side frames 30 by second link shafts 28, and are biased downward and forward by spiral springs 36. The spiral springs 36 are set to apply biasing forces that can prevent the seatback from moving backward by the pressure of the passenger in an ordinary state. Stoppers 30a that restrict the link members 25 from pivoting forward are formed on the side frames 30 by cutting and bending upright portions of the side frames 30. Note that coil springs may extend between the side frames 30 and headrest movable frame 22 in place of the spiral springs 36.

The lower portion of the headrest movable frame 22 is located in correspondence with the passenger's waist to serve as a pressure receiving portion.

Figure 8:
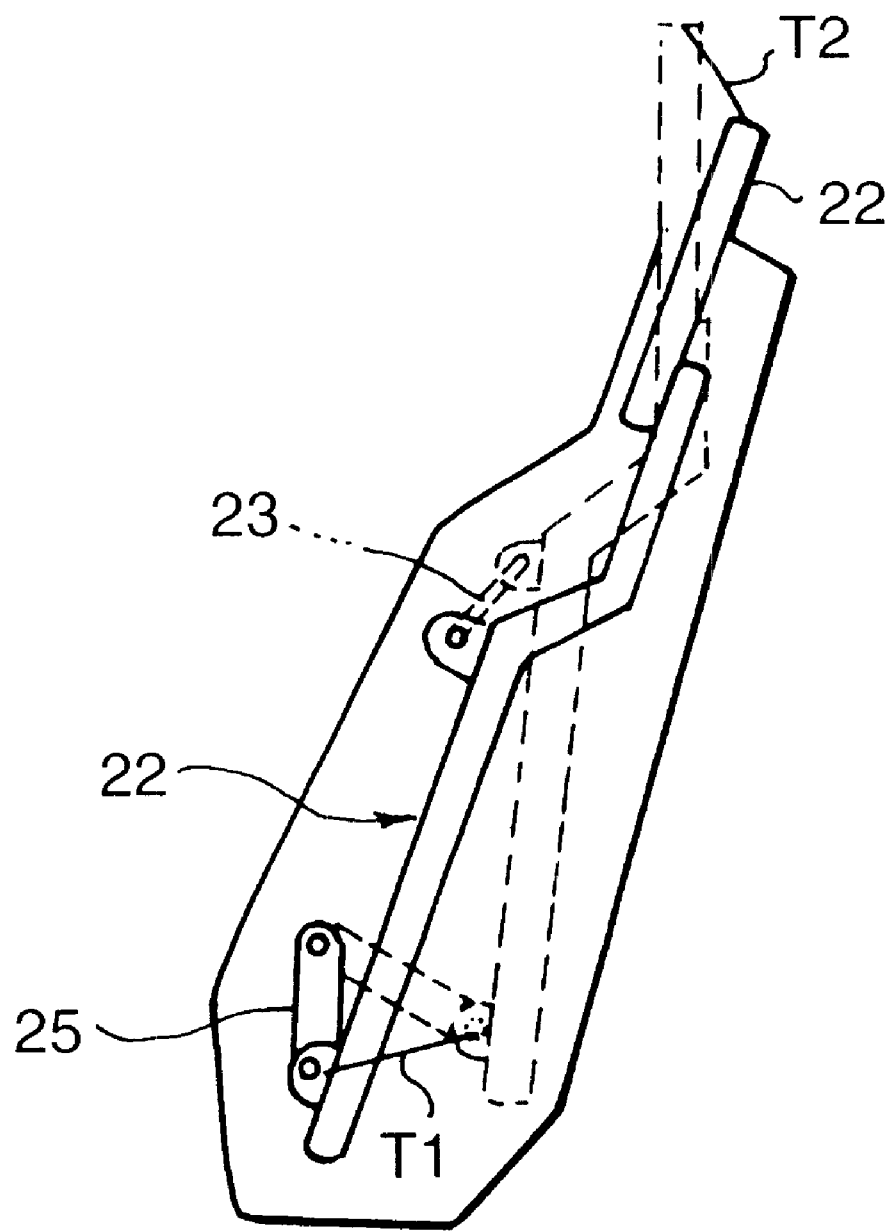
FIG. 8 is a side perspective view of the seatback of the second embodiment, which explains the operation of a headrest movable frame when a load acts from the waist of a passenger in a rear impact collision.
Figure 9:
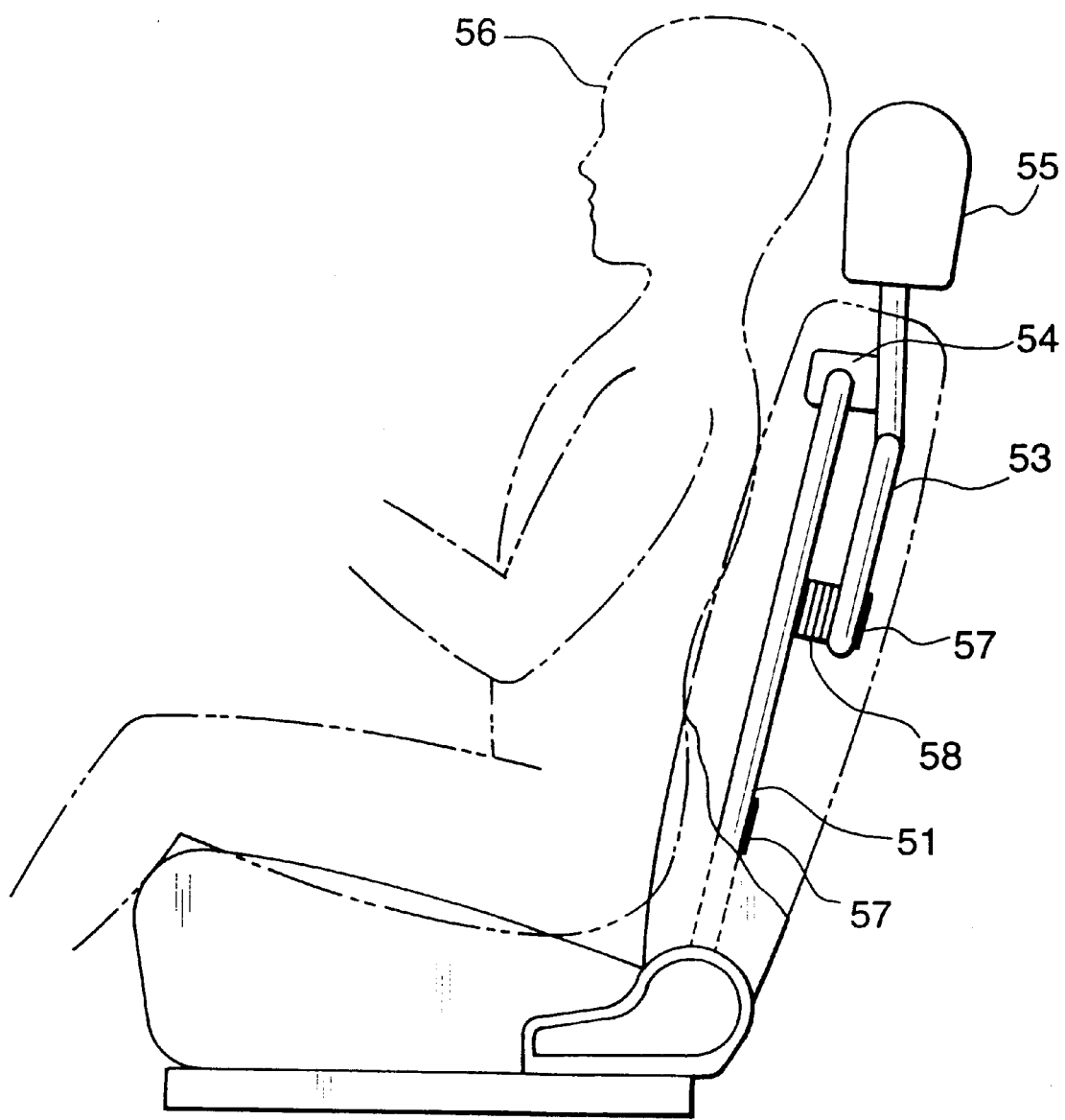
FIG. 9 is a side view showing a conventional seat structure for a vehicle.
Figure 10:
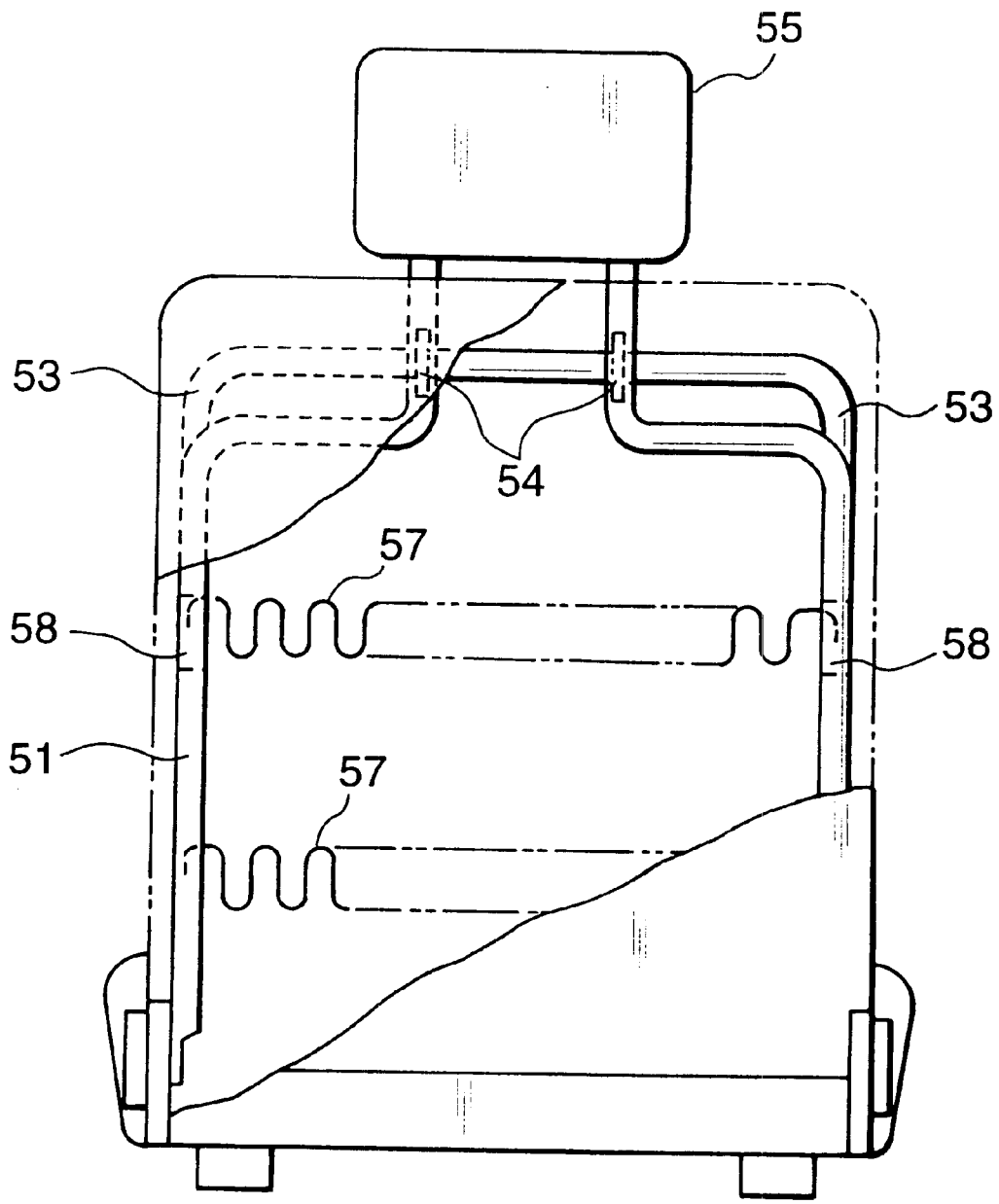
FIG. 10 is a rear view showing the conventional seat structure for a vehicle.
Figure 11:
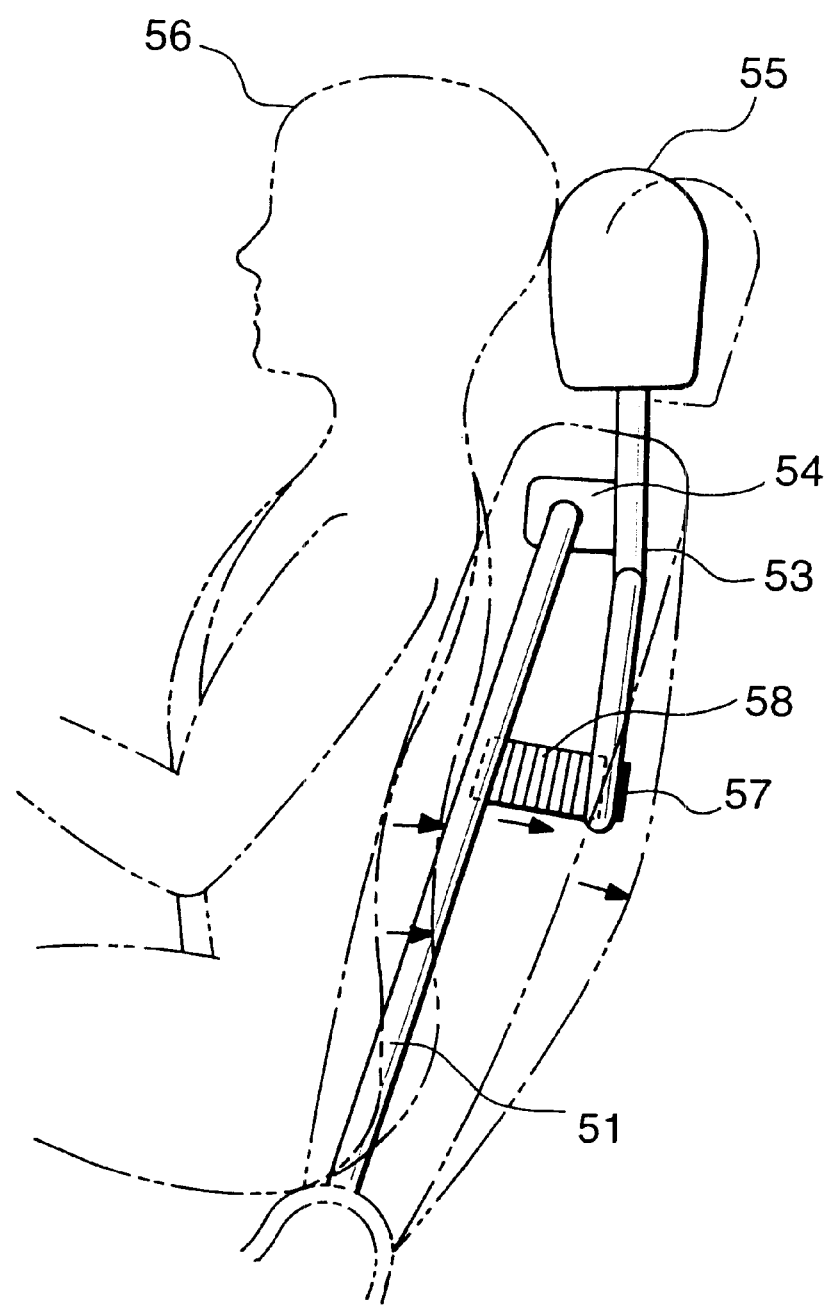
FIG. 11 is a side view showing the state of a seatback in a rear impact collision.
Figure 12:
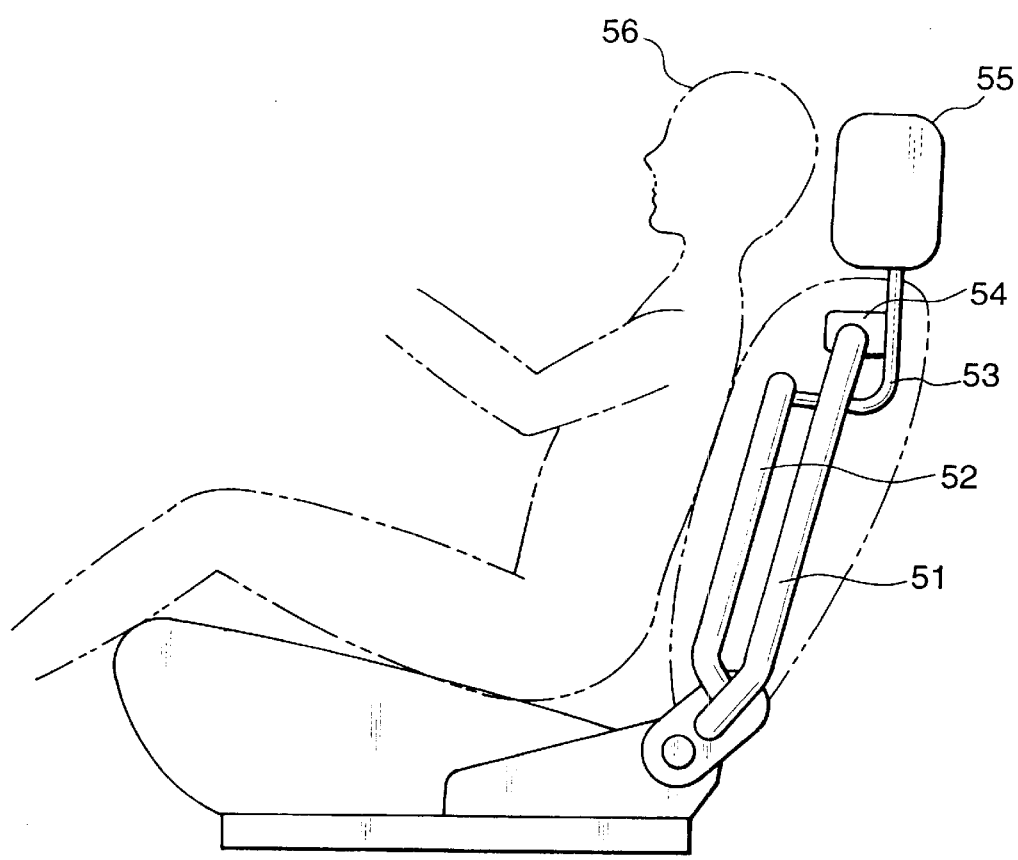
FIG. 12 is a side view showing another conventional seat structure for a vehicle.
Figure 13:
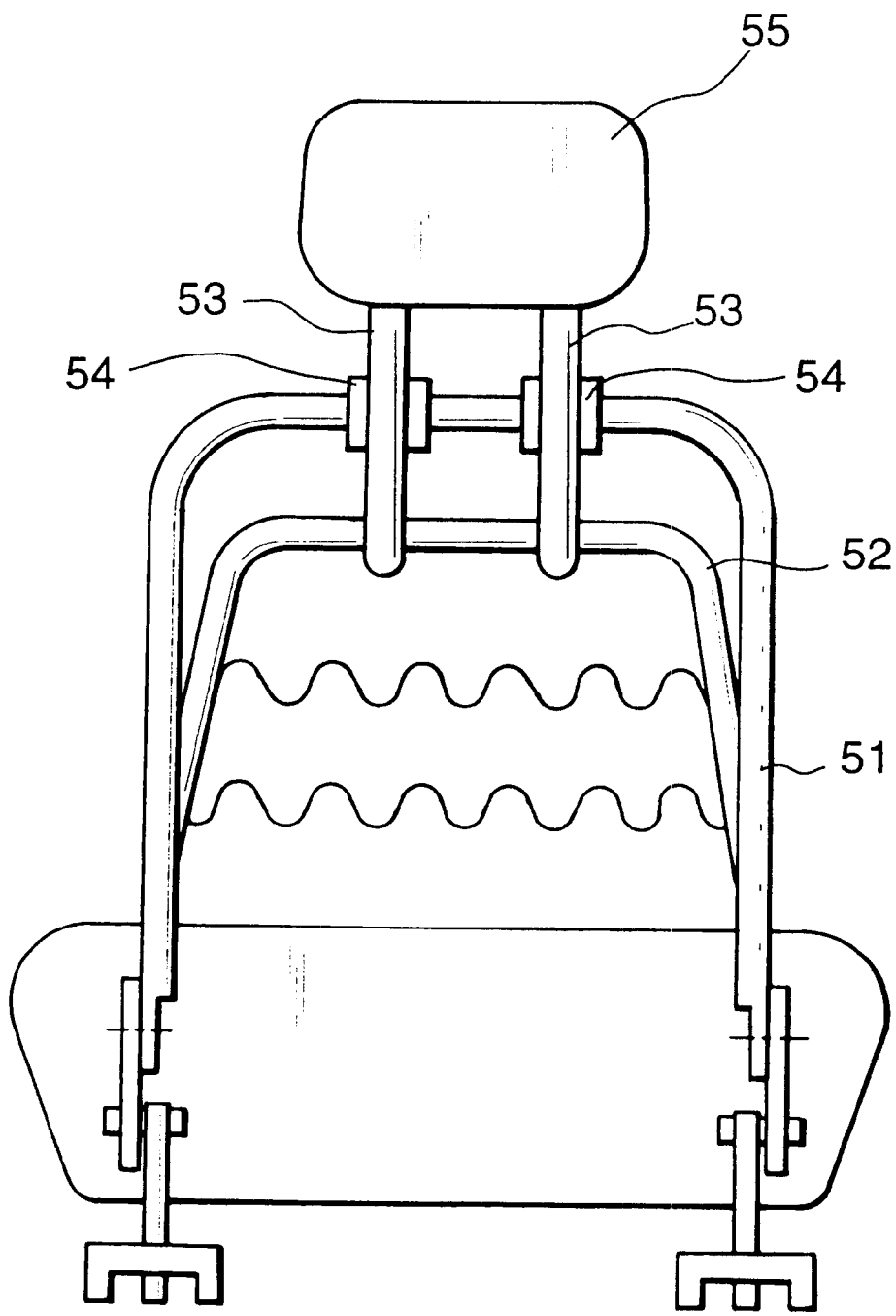
FIG. 13 is a rear view showing the conventional seat structure for a vehicle.
Figure 14:
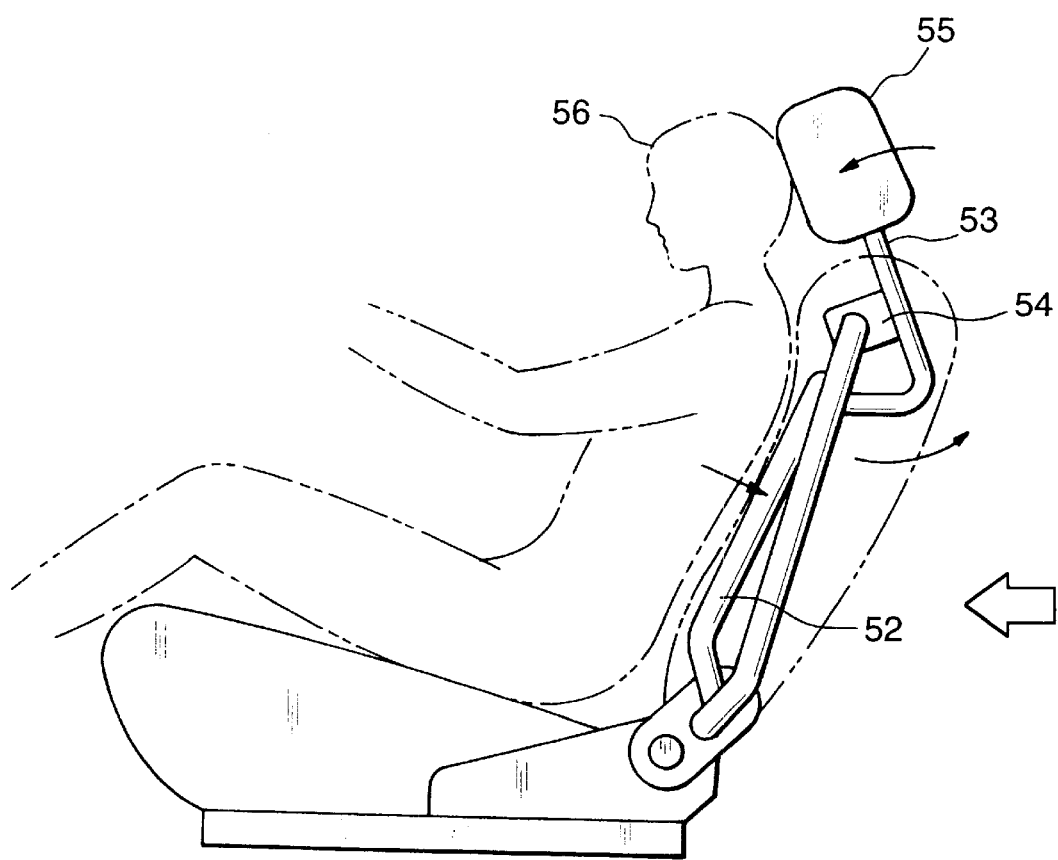
FIG. 14 is a side view showing another conventional seat structure for a vehicle.

FIG. 8 is a side perspective view of the seatback of this embodiment, which explains the operation of the headrest movable frame when a load acts from the waist of a passenger in a rear impact collision.

As shown in FIG. 8, the link members 25 move the headrest movable frame 22 backward and forward (path T1) by the load acting on the lower portion of the lower frame 22c of the headrest movable frame 22, and the guide holes 3 move the headrest movable frame 22 upward (one-dashed chain curve in FIG. 8).

Referring to FIG. 8, since the guide holes 23 are formed into a shape which is convex toward the rear side of the vehicle body, the headrest movable frame 22 linearly displaces the headrest 21 upward and forward (moving path T2) in cooperation with the link members 25 (moving path T1). Since the headrest 21 linearly moves, the moving speed of the headrest toward the passenger's head can be set to be nearly constant while the headrest 21 is being displaced at an identical speed. The headrest support guides 22a cross the upper edge portion of the upper frame 31 on the front side of the vehicle body and restrict upper and forward displacement of the headrest 21 by the restriction member 35. That is, since the headrest support guides 22a contact the upper edge portion of the upper frame 11 while no load acts thereon, even when the head of the seated passenger exerts a backward load on the headrest 21 backward with respect to the vehicle body, or even when the passenger who is seated on a rear seat exerts a load on the lower portion of the headrest movable frame 22 from behind the seatback to the front side of the vehicle body, the headrest movable frame 22 can be prevented from moving unnecessarily.

In a rear impact collision, since the headrest must be quickly and stably moved forward and upward toward the passenger's head, the axial support portions 24 of the headrest movable frame 22 are set at substantially the central positions of the seat back in the up-and-down direction to set larger distances from the axial support portions 24 to the headrest 21, so as to assure a forward moving amount of the headrest. However, in such case, since the portion of the headrest movable frame 22 above the axial support portions 24 is largely displaced forward, that frame upper portion undesirably pushes the passenger's back forward. Therefore, the upper frame 22b above the guide shafts 24 protrudes backward to allow backward movement of the passenger's back.

As many apparently widely different embodiments of the present invention can be made without departing from the spirit and scope thereof, it is to be understood that the invention is not limited to the specific, embodiments thereof except as defined in the appended claims.

What is claimed is:

1. A seat structure for a vehicle, which comprises a headrest placed behind a passenger's head, and a load transfer portion which has a pressure receiving portion that is located at substantially the same level as a passenger's waist, and receives a load from the passenger's waist in a rear impact collision, and displaces said headrest along a predetermined path by the load acting on said pressure receiving portion, comprising:

a seatback frame having an upper surface frame which is arranged on an upper end face of a seatback, and extends in a widthwise direction of a vehicle body, and side surface frames which are arranged on side end faces of the seatback, and extend in an up-and-down direction,
   wherein said load transfer portion is axially supported by said side surface frames at a position below said upper surface frame, and crosses said upper surface frame of the seatback when viewed from a back-and-forth direction of the vehicle body to permit forward displacement of said headrest, and contacts said upper surface frame in an ordinary state, and is allowed to be displaced only toward a front side of the vehicle body so as to prevent said headrest from moving toward the rear side of the vehicle body even when said headrest is pushed toward the rear side of the vehicle body, or when a portion of said load transfer portion below axial support points by said side surface frames is pushed toward the front side of the vehicle body, and is formed by an upper portion, a lower portion, headrest support guides extending upward from the upper portion, and right and left side portions of which both ends area connected to each end of the upper portion and the lower portion and which are movably supported by the side surface frames.

2. The structure according to claim 1, characterized in that an instantaneous center of rotation of said load transfer portion is located above a mean load point of loads acting from a passenger to said pressure receiving portion and said load transfer portion in a rear impact collision.

3. The structure according to claim 1, further comprising a first guide for moving said pressure receiving portion backward and upward by the load acting on said pressure receiving portion, and a second guide for moving said load transfer portion upward, and wherein said first guide is located below said second guide, and said first and second guides respectively axially support said load transfer portion and said pressure receiving portion on said side surface frames below said upper surface frame.

4. The structure according to claim 3, characterized in that said first and second guides comprise a combination of link members for coupling said side surface frames and said pressure receiving portions, and guide holes which are formed in said side surface frames and guide said load transfer portion upward.

5. The structure according to claim 3, wherein said first guide comprises link members for coupling said side surface frames and said pressure receiving portions, and said second guide comprises guide holes which are formed in said side surface frames and guide said load transfer portion upward.

6. The structure according to claim 3, characterized in that said first guide comprises link members for coupling said side surface frames and said pressure receiving portions, and guide holes which are formed in said side surface frames and guide said load transfer portion upward.

7. The structure according to claim 3, wherein said second guide comprises guide holes formed in said side surface frame to guide said load transfer portion upward, and each of said guide holes has an arcuated shape which is convex toward a rear side of the vehicle body.

8. The structure according to claim 7, wherein each of said guide holes has a shape which makes a moving path of said headrest to be a path which is convex downward compared to a linear path.

9. The structure according to claim 7, wherein each of said guide holes has a shape for linearly displacing said headrest upward and forward.

10. The structure according to claim 1, wherein said load transfer portion is surrounded by said side surface frames of the seatback so as to prevent an outer surface shape of the seatback from changing upon displacing said headrest.

11. A seat structure for a vehicle, which comprises a pressure receiving portion for receiving a load from a passenger's waist in a rear impact collision, a load transfer portion for supporting a headrest placed behind a passenger's head, and displacing the headrest along a predetermined path by a load acting on said pressure receiving portion, and a seatback frame for pivotally and axially supporting said load transfer portion by side surface portions thereof, comprising:

an allowance portion which allows backward displacement of a passenger's chest and is formed above axial support portions of said load transfer portion in said seatback frame, wherein said allowance portion is formed by bending backward a portion of said load transfer portion just above the axial support portions, and at least a portion of said load transfer portion above the axial support portions is comprised of a rectangular frame, and is formed in a space bounded by a the rectangular frame, and said load transfer portion is formed by an upper portion, a lower portion, headrest support guides extending upward from the upper portion, and right and left side portions of which both ends are connected to each end of the upper portion and the lower portion and which are movably supported by the side surface portions of said seatback frame, and the right and left side portions extending from a portion just above the axial support portions to the upper portion are set backward to the right and left side portions extending from a portion below the axial support portions to the lower portion.

12. The structure according to claim 11, wherein a shock absorber for absorbing a load acting upon backward displacement of the passenger's chest is arranged in the space.

13. A seat structure for a vehicle, which comprises a pressure receiving portion for receiving a load from a passenger's waist in a rear impact collision, a load transfer portion for supporting a headrest placed behind a passenger's head, and displacing the headrest along a predetermined path by a load acting on said pressure receiving portion, and a seatback frame for pivotally and axially supporting said load transfer portion by side surface portions thereof, wherein the headrest is supported by headrest support portions provided on an upper edge portion of said load transfer portion, a restriction member for restricting back-and-forth movement of said headrest support portions is provided to an upper edge portion of said seatback frame and is bent to surround both side portions and front portion of said headrest support portions, and said headrest support portions are placed on a front surface of the upper edge portion of said seatback frame, and said restriction member restricts forward movement of said headrest support portions.

14. The structure according to claim 13, wherein said restriction member has a gap for allowing said headrest support portion to move by only a predetermined amount.

15. The structure according to claim 13, wherein said restriction member comprises a lock member for locking a seat surface.

* * * * *

UNITED STATES PATENT AND TRADEMARK OFFICE
CERTIFICATE OF CORRECTION

PATENT NO. : 6,523,892 B1
DATED : February 25, 2003
INVENTOR(S) : Masayuki Kage et al.

It is certified that error appears in the above-identified patent and that said Letters Patent is hereby corrected as shown below:

Title page,
Item [56], References Cited, U.S. PATENT DOCUMENTS, delete "6,062,243" add -- 6,062,643 --; and
FOREIGN PATENT DOCUMENTS, delete "JP 07291005  11/1995 and JP 10080338  3/1998"

Signed and Sealed this

Twenty-second Day of June, 2004

JON W. DUDAS
*Acting Director of the United States Patent and Trademark Office*